Dec. 1, 1959 W. B. CAGLE 2,915,649

ELECTRICAL PULSE CIRCUIT

Filed March 8, 1957

INVENTOR
W. B. CAGLE
BY [signature]
ATTORNEY 2,915,649
Patented Dec. 1, 1959

2,915,649

ELECTRICAL PULSE CIRCUIT

William B. Cagle, Madison, N.J., assignor to Bell Telephone Laboratories, Incorporated, New York, N.Y., a corporation of New York Application March 8, 1957, Serial No. 644,853

9 Claims. (Cl. 307—88.5)

This invention relates to electrical pulse circuits and more particularly to such circuits utilizing pulses of opposite polarity.

There are known in the art various ways of improving the shape of pulse waveforms for the desired operation of designated equipment, among which ways may be mentioned amplification, delay of a portion of the pulse, or regeneration. The last-named method customarily utilizes a pulse generator which is under the control of the pulse to be transformed. Regeneration is particularly suitable to the reproduction of substantially rectangular pulses, especially where alternating current coupling is desired in the input circuit. Such a pulse generator may advantageously consist of a bistable multivibrator or flip-flop. In a preferred use of such a circuit, the flip-flop is maintained in one stable state during the presence of its driving pulse and in the other stable state during the absence of its driving pulse. Thus the input pulse may be suitably reproduced at the flip-flop output with a substantial increase in amplitude, if desired.

In recent years circuits utilizing transistors for the performance of such functions have been developed in the art. It is known that a single transistor of the point contact type may be used in a flip-flop circuit. In one stable state the transistor is maintained in a saturated or essentially short-circuit condition; in the other stable state the transistor is held in an Off or essentially open-circuit condition. One problem encountered with such a device has been the relatively slow transition from the saturated state to the Off condition, resulting in a degradation of the trailing edge of the regenerated pulse, where the flip-flop is operated with a quiescent open-circuit state. The inability of a deeply saturated transistor to be switched rapidly to the open-circuit condition under the influence of normal control signals is due to the storage of excess minority carriers within the base region of the transistor. The internal electric field of the transistor cannot be changed by the reversal of the externally applied potentials until such minority carriers are swept out of the base region, an operation requiring the application of considerably more driving signal energy to accomplish such a change of internal field in a minimum of time than is needed to turn on the same transistor.

Furthermore, in many similar circuits known in the art in which the separation of pulses according to polarity is essential, it is customary to utilize diode combinations to perform the pulse-steering function. In certain instances undesirable results occur from the lack of isolation of the two pulse paths necessitated by the use of diode circuitry. In such cases, the undesirable feedback, or coupling, has proven difficult to eliminate by methods known in the art.

It is, therefore, a general object of this invention to provide an improved bistable multivibrator circuit of the transistor type.

A more specific object of my invention is to insure the rapid transition from the saturated state to the open-circuit state of a transistor multivibrator.

Another object of this invention is an improved application of input pulses to properly control a bistable multivibrator circuit.

A further object of this invention is to attain separation of trigger pulses according to polarity.

In accordance with my invention, in one specific embodiment thereof, I have provided a point contact transistor functioning as a bistable flip-flop normally maintained in the Off condition, a second transistor also biased in the Off condition, connected therewith, and a pulse transformer connected on the input side of the flip-flop circuit to serve as trigger control means for the flip-flop. A trigger pulse derived from the leading edge of a rectangular control waveform is directed to the flip-flop transistor to turn it on. The trigger signal derived from the trailing edge of the same control waveform is directed by the pulse transformer to the second transistor which amplifies this signal and applies it to the flip-flop transistor at a sufficient energy level to rapidly turn off this transistor, accomplishing the transition between saturation and Off conditions in a minimum of time.

As a feature of my invention, I utilize a transistor as a pulse amplifier to furnish the necessary drive to a saturated transistor flip-flop to ensure its rapid turn-off under the control of an input pulse.

Another feature of this invention is the use of a pulse transformer as a pulse directing means to separate signals of opposite polarity, specifically a circuit configuration in which pulses of one polarity are directed through a transformer primary winding to one load circuit while pulses of the opposite polarity are directed to a second load circuit connected to the secondary winding of the transformer.

A further feature of this invention is the use of a pulse transformer in connection with a bistable flip-flop circuit functioning as a pulse regenerator.

Another feature of my invention is the connection of two transistors in a pulse regenerator circuit such that the reverse leakage collector currents, often known as $I_{co}$, of the two transistors tend to cancel each other, thereby automatically compensating for the undesirable effects of such leakage current.

These and other features of my invention can better be understood by a detailed description of specific embodiments of the principles of the invention diagrammatically depicted in the accompanying drawing, in which.

Figure 1:
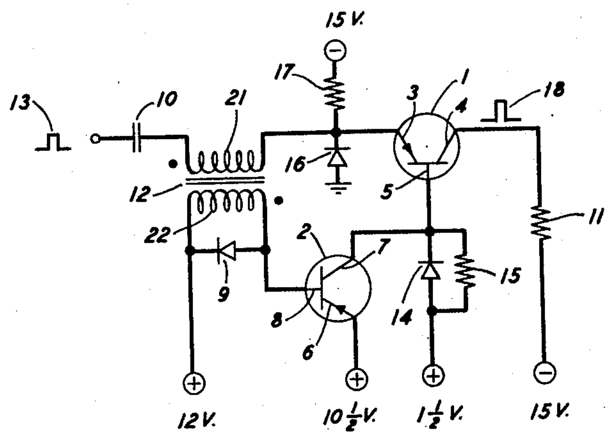
Fig. 1 is one specific embodiment of my invention.

Referring to Fig. 1, a specific embodiment of this invention utilizes a transistor 1 of the point contact type in a bistable flip-flop circuit. Transistor 2, also of the point contact type, is operated as a driving amplifier to supply the additional energy to the base of transistor 1 necessary to switch it from a saturated to an open-circuit condition. In this embodiment both transistors are of the p-n-p type and both are biased in the normally Off condition. On the input side of the flip-flop circuit there is connected a transformer 12 having primary and secondary windings 21 and 22, respectively. In the figure, the dots appearing near one end of each winding are for the purpose of indicating relative terminal polarities. When the primary terminal adjacent the primary dot is of a given polarity with respect to the other primary terminal, the terminal adjacent the secondary dot is of the same polarity with respect to the other secondary terminal. Thus, for example, both dotted terminals are positive at the same time with respect to the opposite terminals of their respective windings. Signal pulses 13 of a substantially rectangular waveform are applied through capacitor 10 to one side of primary winding 21.

In the embodiment shown, the pulses 13 are of a single polarity and capacitor 10 is of such a value of capacitance as will in combination with the rest of the circuit differentiate input pulses 13, thereby producing alternatively positive and negative signals at primary winding 21 as is known in the art.

With the application of a positive signal to the dotted end of primary winding 21 there simultaneously tends to appear a similar signal at the dotted end of secondary winding 22. Diode 9 connected across winding 22 has its polarity in such a direction that positive signals appearing at the dotted end of winding 22 are shorted out across the secondary winding. Since transistor 2 has a reverse bias across its emitter base junction, positive signals on its base 8 merely increase this reverse bias and would have no other effect on the circuit. The diode 9 insures that excessive reverse bias is not applied to the transistor 2.

Because of the high input impedance of transistor 1 in its reverse biased condition, a positive signal at primary winding 21 passes through that winding and drives the emitter 3 of transistor 1 positive with respect to its base 5, thereby turning the transistor on. With the transistor 1 On, diodes 14 and 16 conduct and transistor 1 becomes and remains deep in saturation because of its bistable characteristics. Thus, the first half of the input pulse 13 is regenerated into the first half of the output pulse 18, the potential of the collector 4 changing very rapidly from approximately the collector bias potential, in this case −15 volts, to near the ground reference potential. Transistor 1 can be maintained in this condition as long as it is desired, thereby permitting the regeneration of input signals of considerable width while utilizing alternating current input coupling.

At the termination of pulse 13 the negative signal appears at the dotted ends of windings 21 and 22. The negative signal from secondary winding 22 applied to base 8 of transistor 2 overcomes reverse bias on this transistor and drives it into the conduction region. When transistor 2 turns on, a large positive voltage appears on the base 5 of transistor 1 supplying the necessary energy to sweep out of the base region the excess minority carriers, thereby ensuring rapid transition of transistor 1 from the saturated to the open-circuit state. In this manner, the second portion of the input pulse 13 is regenerated into the second portion of output pulse 18. With the end of the negative pulse from the secondary winding 22 transistor 2 turns itself off and the entire circuit is restored to its normal position waiting the application of another input pulse. Resistor 11 is the load resistor for transistor 1 and acts as the output resistance for this circuit. Resistor 17 connected to the negative 15 volt potential improves the stability of transistor 1 and acts to insure that the transistor 1 does not turn on in response to spurious signals. Resistance 15 is the load resistor for transistor 2 when the latter conducts. The potentials shown are illustrative of those that may advantageously be used for the operation of one specific embodiment of this invention. Other potentials may be applied as is known by those skilled in the art.

Transistors 1 and 2 are so connected that the reverse leakage collector currents, or $I_{co}$, tend to cancel each other at the junction point between the lead from base 5 and the lead from collector 7. Thus, a measure of compensation for the undesirable effects of $I_{co}$ is provided. If the $I_{co}$ of the two transistors are equal, then complete cancellation occurs, and no current flows through the parallel impedance of diode 14 and resistor 15. In such a case, the base potential of transistor 1 remains at its intended value, in this case a positive one and one-half volts, with neither increase nor decrease resulting from the drop across diode 14 and resistor 15. In any case, the partial cancellation of $I_{co}$ for the two transistors tends to minimize the effects of such a drop.

Figure 2:
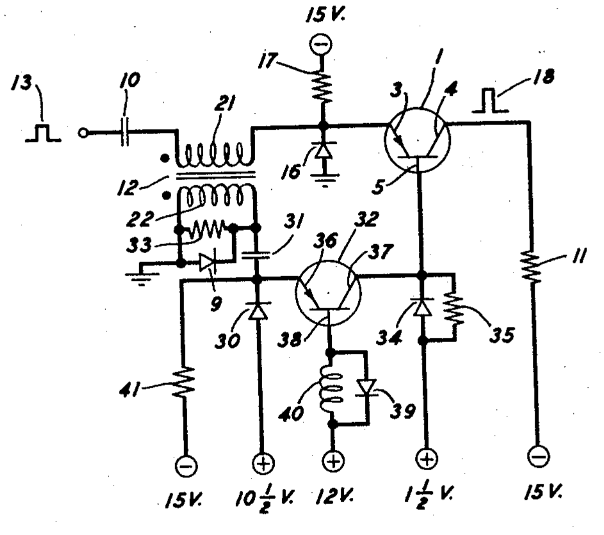
Fig. 2 is a second specific embodiment of my invention.

Fig. 2 depicts another specific embodiment of this invention in which the turnoff time of transistor 32 is made independent of any timing effects on the signal developed across the secondary winding 22 resulting from the value of inductance selected in designing transformer 12. The operation of the portion of the circuit containing transistor 1 is as was described for Fig. 1. The positive increase in the waveform 13 is applied through primary winding 21 to emitter 3, thereby switching transistor 1 to the saturated condition. The corresponding signal at the secondary winding 22 is by-passed through diode 9. At the termination of pulse 13, a positive signal appears at the undotted terminal of secondary winding 22 and is applied through capacitor 31 to emitter 36 of transistor 32. Transistor 32 turns on and applies a large positive voltage to base 5 of transistor 1, thereby causing a rapid transition of transistor 1 from the saturated to open-circuit state. The inductance 40 maintains transistor 32 in the conducting condition until transistor 1 turns off. At that time, the resulting reduction in collector current of transistor 32, due to the opening of the current path through transistor 1, causes the inductance 40 to drive the base 38 in a positive direction, thereby turning off transistor 32. Diode 39 absorbs the inductive kick from inductance 40. Resistor 33 is provided to permit the discharge of capacitor 31. Resistor 41 connected to the negative 15 volt potential prevents the turning on of transistor 32 from spurious signals.

From these embodiments and the description of the invention it can be seen that the transformer 12 functions as a steering gate at the input of the bistable flip-flop circuit. Pulses of one polarity are directed to one control lead of the flip-flop while pulses of the opposite polarity are directed to the second flip-flop control lead. This invention is not intended to be limited to the utilization of a pulse transformer for such a purpose. Other suitable transformer devices, as for example, a magnetic core with multiple windings, may be utilized within the scope of this invention by those skilled in the art. Furthermore, it can be seen that the rapid turn-off of the flip-flop transistor 1 is achieved by amplifying the control pulse through the driving amplifier transistor.

It is to be understood that the above described embodiments of this invention are merely illustrative of the principles of the invention. The potentials shows in the depicted embodiments of Figs. 1 and 2 are merely suitable for the satisfactory operation of these embodiments and are not intended to limit the invention. Numerous other arrangements may be devised by those skilled in the art without departing from the spirit and scope of the invention.

What is claimed is:

1. An electrical circuit comprising a first transistor having first and second states of operation, a transformer having a primary and a secondary winding, a capacitor in series with said primary winding, means for applying pulses to said primary winding through said capacitor, means series connecting said first transistor to said primary winding opposite said capacitor to cause said first transistor to assume its first state on application of a pulse to said capacitor, and means including a second transistor connecting said first transistor to said secondary winding to activate said second transistor and cause said first transistor to assume its second state on termination of said pulse.

2. An electrical circuit, in accordance with claim 1, wherein each of said transistors includes a collector, emitter and base. said first transistor emitter being connected to said primary winding, said second transistor base being connected to said secondary winding, and said second transistor collector being connected to said first transistor base.

3. An electrical circuit comprising a first transistor having first and second states of operation, a second transistor, each of said transistors including a collector, emitter and a base, a transformer having a primary and a secondary winding, a capacitor in series with said primary winding, means for applying pulses to said primary winding through said capacitor, means series connecting said first transistor to said primary winding to cause said first transistor to assume its first state on application of a pulse to said capacitor, said first transistor emitter being connected to said primary winding, means including said second transistor connecting said first transistor to said secondary winding to activate said second transistor and cause said first transistor to assume its second state on termination of said pulse, said second transistor collector being connected to said first transistor base, and inductance means connected to said second transistor base.

4. An electrical circuit in accordance with claim 1 further comprising means including said capacitor for differentiating said pulses applied thereto, said capacitor charging through said first transistor, and means providing a discharge path for said capacitor.

5. An electrical circuit in accordance with claim 4 wherein said primary winding is connected to the emitter electrode of said first transistor and said discharge path means includes a diode connected to said emitter electrode and poled in the opposite direction to the emitter-base junction of said transistor.

6. An electrical circuit in accordance with claim 1 wherein said means for activating said second transistor and causing said first transistor to assume its second state on termination of said pulse includes means for maintaining said second transistor activated until said first transistor assumes said second state.

7. An electrical circuit comprising a transformer having a primary and a secondary winding, a load series connected to said primary winding, a capacitor serially connected to said primary winding remote from said load, means for applying pulses of one polarity to said capacitor, said capacitor charging through said load to apply a first signal to said load, a discharge path for said capacitor connected to said primary winding, and means responsive to the discharging of said capacitor through said discharge path for applying a second signal to said load, said last-mentioned means including means serially connecting said secondary winding and said load.

8. An electrical circuit in accordance with claim 7 wherein said load comprises a transistor and said capacitor in charging and discharging through said load and said discharge path differentiates said applied pulses, said transistor having one electrode connected to said primary winding so as to be turned on by a signal of one polarity on charging of said capacitor and having a second electrode connected to said means serially connecting said secondary winding and said transistor so as to be turned off in response to signals of the opposite polarity on the discharging of said capacitor.

9. An electrical circuit in accordance with claim 7 wherein said load comprises a bistable device and said capacitor in charging and discharging through said load and said discharge path differentiates said applied pulses, said bistable device having one input terminal connected to said primary winding so as to be switched to one state by signals of one polarity on the charging of said capacitor and having a second terminal connected to said means serially connecting said secondary winding and said load so as to be switched to the other of its states in response to signals of the opposite polarity on the discharging of said capacitor.

References Cited in the file of this patent

UNITED STATES PATENTS

| | | |
|---|---|---|
| 2,485,395 | Lord | Oct. 18, 1949 |
| 2,509,792 | Westcott | May 30, 1950 |
| 2,708,241 | Bess | May 10, 1955 |